United States Patent
Cordier et al.

(10) Patent No.: US 6,226,281 B1
(45) Date of Patent: May 1, 2001

(54) METHOD OF CONTROLLING TERMINAL TRANSMISSION POWER IN A CMDA TYPE CELLULAR NETWORK, AND A BASE STATION AND A BASE STATION CONTROLLER IMPLEMENTING THE METHOD

(75) Inventors: Christophe Cordier, Paris; Marco Fratti, St Germain en Laye, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/052,102

(22) Filed: Mar. 31, 1998

(30) Foreign Application Priority Data

Apr. 3, 1997 (FR) .................................................. 97-04075

(51) Int. Cl.$^7$ ...................................................... H04B 1/69
(52) U.S. Cl. ........................................... 370/335; 370/362
(58) Field of Search ................................ 370/32 B, 335, 370/342, 441, 479; 455/522

(56) References Cited

U.S. PATENT DOCUMENTS

| | | | |
|---|---|---|---|
| 5,245,629 | * 9/1993 | Hall | 455/522 |
| 5,267,262 | * 11/1993 | Wheatley, III | 455/522 |
| 5,333,175 | * 7/1994 | Ariyavisitakul et al. | 455/423 |
| 5,475,861 | * 12/1995 | Hall | 455/422 |
| 5,559,790 | * 9/1996 | Yano et al. | 370/342 |
| 5,619,525 | * 4/1997 | Wiedeman et al. | 375/130 |
| 5,689,815 | * 11/1997 | Yamazaki et al. | 455/69 |

FOREIGN PATENT DOCUMENTS

| | | |
|---|---|---|
| WO9307702 | 4/1993 | (WO) . |
| WO9309626 | 5/1993 | (WO) . |

* cited by examiner

*Primary Examiner*—Hassan Kizou
*Assistant Examiner*—Ahmed Elallam
(74) *Attorney, Agent, or Firm*—Sughrue, Mion, Zinn, Macpeak & Seas, PLLC

(57) ABSTRACT

The invention relates to a method of controlling the transmission power of terminals in a CDMA type cellular network. According to the invention, when the transmission power of a number n1 of terminals is authorized to be increased by a total amount P dB, a number n2 of terminals benefitting from better quality of transmission in the up direction are requested to decrease their total transmission power by P dB. This makes it possible to conserve interference at a constant level in the transmission network, either within a single cell, or within a group of cells.

12 Claims, 2 Drawing Sheets

| | T | Pe | Eb/No | |
|---|---|---|---|---|
| 1 | | | | ← 27 |
| n2 | | | | |
| S | | | | |
| N | | | | |

METHOD OF CONTROLLING TERMINAL TRANSMISSION POWER IN A CMDA TYPE CELLULAR NETWORK, AND A BASE STATION AND A BASE STATION CONTROLLER IMPLEMENTING THE METHOD

The field of the invention is that of transmitting radio signals in code division multiple access (CDMA) type cellular networks. More precisely, the present invention relates to a method of controlling terminal transmitter power in a CDMA type cellular network, and to a base station controller and a base station implementing the method.

BACKGROUND OF THE INVENTION

A CDMA type cellular network is constituted by a plurality of cells each having radio coverage provided by a base station. The base stations are connected to a controller. Within each cell, terminals, e.g. mobile terminals, communicate in CDMA mode with the base station of the cell, i.e. with all of the terminals using transmission in the same frequency band, and with transmitted data being spread by spreading sequences. These sequences are conventionally pseudo-random number (PN) sequences that are statistically orthogonal to one another, so as to limit interference between signals that have been spread by different sequences.

In such a cellular network, when interference within a cell increases, signal-to-noise ratio (S/N) conditions deteriorate and the base station of the cell requests each active terminal to increase the power of the signals it transits by some number of decibels (dB). The interference may come either from terminals transmitted in adjacent cells and parented on other base stations, or else be due to an increase in the number of users in the cell in question. Interference is due to a loss of statistical orthgonality between the spreading sequences because of multiple paths.

That problem is raised in PCT patent application WO 93/09626 which is fully incorporated in the present application by reference.

The drawback of that solution is that a generalized increase in the transmission power of the terminals gives rise not only to interference within the cell under consideration, but also causes increased interference in adjacent cells. The base stations of the adjacent cells will therefore also request the terminals with which they are in communication to increase their transmission powers in order to overcome the interference. Very quickly, this mechanism can therefore lead to escalation until all of the terminals throughout the CDMA network have reached maximum transmission power, thereby completely paralyzing the system.

OBJECTS AND SUMMARY OF THE INVENTION

A particular object of the present invention is to remedy that drawback.

More precisely, one of the objects of the invention is to provide a method of controlling terminal transmission powers in a CDMA type cellular network that does not lead to the communications system becoming paralyzed.

Another object of the invention is to provide a base station and a base station controller that implements the method.

These objects, and others that appear below, are achieved by a method of controlling the transmission power of terminals in a CDMA type cellular network, wherein, when the transmission power of a number n1 of said terminals is authorized to be increased by a total amount P dB, the method consists in instructing a number n2 of said terminals, benefiting from better transmission quality in the up direction, to decrease their total transmission power by P dB.

Terms concerning "total" increase in transmission power are used to designate the sum of the power increases of the n1 terminals. Similarly, terms concerning "total" decrease of transmission power correspond to the sum of the decreases in the transmission powers of the n2 terminals. In this way, equilibrium is obtained between the power increases and the power decreases from the terminals, thereby making it possible to conserve a constant level of interference in the cell or cells under consideration.

Advantageously, said n2 terminals are those benefiting from the best transmission quality in said up direction. Thus only those terminals that are already benefitting from best transmission quality are penalized.

The quality criterion making it possible to define up transmission quality is preferably the signal-to-noise ratio S/N, which is proportional to the energy received per information bit divided by the spectrum density of the noise power, Eb/No. This noise power spectrum density is the sum of the contributions of thermal noise plus interference.

The method of the invention is advantageously applied to mobile terminals. It can be implemented in a base station of a CDMA type cellular network or in a base station controller for such a network.

The method of the invention is preferably implemented when the mean level of total received power at the base station exceeds a first threshold value or when the sum of the terminal transmission powers exceeds a second threshold value.

The invention also provides a base station for a CDMA type cellular network in which terminals are to communicate. The base station includes means for allocating to a number n1 of terminals suffering from insufficient transmission quality in the up direction shares in a total transmission power resource equal to the sum of power decreases requested of a number n2 of terminals benefiting from transmission of better quality in said up direction.

The invention also provides a controller for base stations in a CDMA type cellular network in which terminals are to communicate. The controller includes means for allocating to a number n1 of terminals suffering from insufficient transmission quality in the up direction shares in a total transmission power resource equal to the sum of power decreases requested of a number n2 of terminals benefiting from transmission of better quality in said up direction.

BRIEF DESCRIPTION OF THE DRAWINGS

Other characteristics and advantages of the invention appear on reading the following description of a preferred implementation, given by way of non-limiting illustration, and with reference to the accompanying drawings, in which.

MORE DETAILED DESCRIPTION

The purpose of the method of the invention is to obtain a constant level of interference in a cellular network, either within a single cell covered by a base station, or else within a group of cells covered by a plurality of base stations connected to a controller. To this end, the invention proposes controlling the transmission power of the active terminals in a cell or in a group of cells in which the transmission power of some terminals suffering poor communication quality in the up direction (from the terminals to the base stations) is increased and is compensated by a corresponding decrease in the transmission power of terminals that are enjoying better communication conditions in the up direction. The total transmission power from the active terminals in the cell or cells under consideration is thus under control and the level of interference remains constant.

A particularly advantageous communication quality criterion is constituted by measured or estimated signal-to-noise ratios (S/N or Eb/No). Nevertheless, it is possible to use some other criterion for assessing the quality of communication from the terminals to the base station(s), e.g. received signal power.

In the description below, the quality criterion used for estimating the quality of communication in the up direction is signal-to-noise ratio. The way in which this signal-to-noise ratio is obtained in a base station is explained below.

By way of example, if transmission conditions require that a number n1=3 of terminals that are disadvantaged by their transmission conditions need to increase their transmission power, one of them by 0.5 dB and the other two by 0.25 dB each, giving a total power increase of 1 dB, then the transmission power of n2=4 terminals (for example) that are benefitting from more favorable transmission conditions will be decreased by 0.25 dB each so that the allocated transmission power increase is compensated exactly by the requested power decrease. Naturally, it is possible to share power decreases between terminals benefitting from better Eb/No ratios differently, e.g. by requesting the terminal amongst the n2 terminals that has the greatest Eb/No ratio to take a greater decrease in transmission power than the other (n2 -1) terminals. The numbers n1 and n2 are a function, in particular, of the number of active terminals, of the total power increase that is required, and of the quality of each active call. The number n1 depends on the fixed threshold value for the ratio Eb/No from which the quality of a call is judged to be unsatisfactory.

Figure 1:
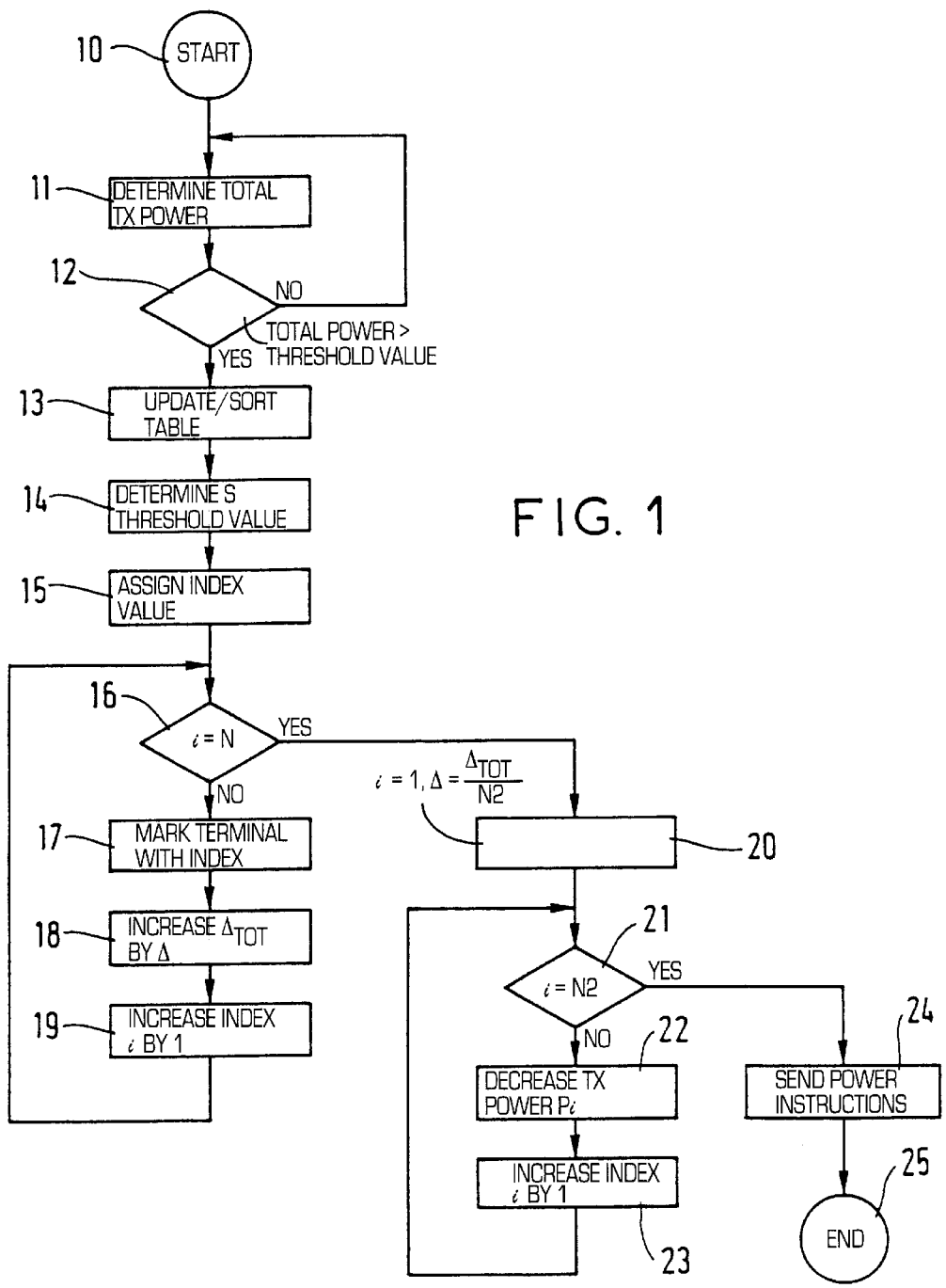
FIG. 1 is a flow chart showing the various steps of a preferred implementation of the method of the invention.

FIG. 1 is a flow chart showing the various steps in a preferred implementation of the method of the invention.

Initially, it is assumed that the method of the invention is applied to a single cell of a CDMA network. Step 10 is a start step. At step 11, the total transmission power of the active terminals in the cell in question is acquired. These terminals are the terminals which are in communication with the base station of the cell. Two implementations are possible: the total transmission power may either result from measuring the power of the signals received at the base station, or else by estimating said power on the basis of power increase or decrease instructions previously transmitted to the terminals. For estimation purposes, the base station includes a table showing the transmission power level allocated to each active terminal. The sum of these power levels corresponds to the estimate. Measuring the power of received signals constitutes a preferred implementation since it makes it possible to discover accurately the level of interference that has been reached, whereas the above-specified estimate does not take propagation conditions into account.

At step 12, the acquired power is compared with a threshold value. This test consists either in comparing the total power level received at the base station with a first threshold value, or in comparing the estimate with a second threshold value. If the threshold value is not exceeded, then the level of interference in the cell in question is judged to be low enough for there to be no danger of escalation and the method returns to step 11.

If the threshold value is exceeded, then it is considered necessary to maintain the level of interference in the cell constant since otherwise there is a risk of the system becoming paralyzed. Under such circumstances, the method of the system proposes, in step 13, selecting a number n2 of active terminals in the cell where the n2 terminals are benefitting from good, if not the best, signal-to-noise ratios, and requesting these terminals to decrease their total transmission power by some number P of decibels, this decrease in power optionally being shared equally between the n2 terminals. In parallel, some number n1 of terminals having the smallest signal-to-noise ratios are authorized to increase their total transmission power by the same quantity P of decibels, with the decibels allocated to these n1 terminals that are less favored by transmission conditions optionally being shared equally.

To this end, the base station providing coverage for the cell includes a table relating each terminal not only to the transmission power allocated to the terminal, but also to a communication quality criterion in the up direction, with this criterion being constituted, for example, by the Eb/No ratio as measured or estimated for the terminal.

Figures 2, 3:
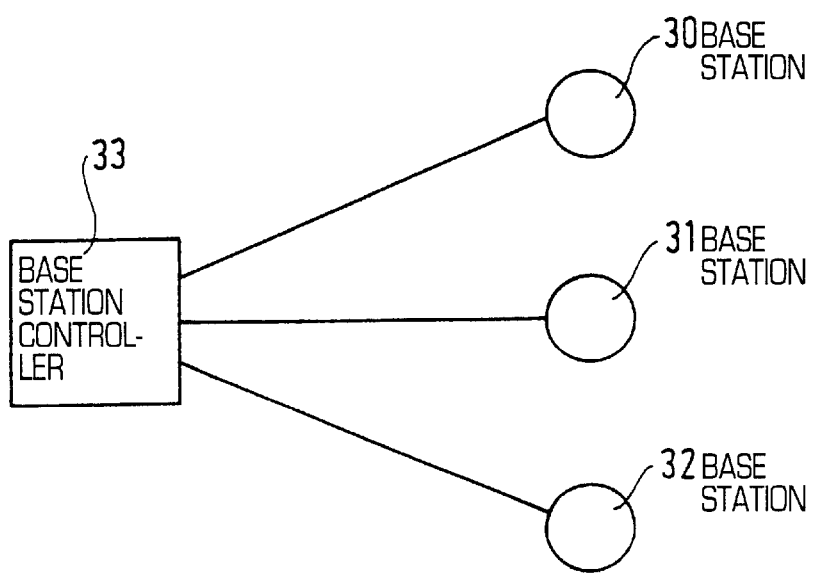
FIG. 2 is a table in which each of the active terminals in the network is given a transmission power measurement and a signal-to-noise ratio.
FIG. 3 is a diagram representing a CDMA type cellular network.

One such table, referenced 27, is shown in FIG. 2, where T is the header of a column for identifying terminals, Pe is the header for a column specifying the transmission power allocated to each terminal, and Eb/No is the header for the column giving the quality criterion that is used. If the Eb/No ratio of a terminal is large, that means that communication quality on the up path (terminal to base station) is good, and vice versa. The table is preferably re-sorted each time there is a change in Eb/No ratio so that the terminals are ordered as a function of the transmission conditions from which they are benefitting, for example so as to put the most favored terminals in terms of transmission quality at the top of the table.

More precisely, step 13 consists in updating the Eb/No ratio table and in sorting the terminals as a function of decreasing Eb/No. The terminals benefitting from the most favorable transmission conditions are then at the top of the table while those having the least favorable transmission conditions are at the bottom of the table. N terminals are considered as being active, and each terminal is identified by an index i, where i lies in the range 1 to N. Step 14 then consists in determining a reference threshold value S corresponding to the Eb/No ratio below which it is considered that a terminal ought to be authorized to increase its transmission power. This threshold is shown in FIG. 2.

Step 15 is an initialization step consisting in giving an index the value pointing to the first terminal in the table of FIG. 2 that has an Eb/No ratio below the threshold value S. The value of an accumulator $\Delta_{tot}$ is set to zero. At step 16, the index value i is tested for equality with N. If the answer is "no", step 17 consists in marking the transmission power of the station of index i for a subsequent increase by a quantity $\Delta$ ($P_i=P_i+\Delta$). In this case, the quantity $\Delta$ is predefined and corresponds, for example, to a transmission power increase of 0.25 dB. In step 18, $\Delta_{tot}$ is increased by the quantity $\Delta$, and in step 19, the index i is increased by 1. The method then returns to step 16.

If the test in step 16 gives the answer "yes", that means that the transmission powers of all of the terminals having an Eb/No ratio below the threshold value S are programmed each to be increased by the quantity Δ. There are n1 of these terminals. The method then continues with step 20 (an initialization step) where the index i is set to 1 (pointing to the top of the table 27) and where a quantity Δ equal to $\Delta_{tot}/n2$ is calculated. Step 21 consists in testing whether the value of the index is equal to n2. If the answer is "no", the transmission power of the terminal of index i is programmed for a subsequent decrease by a quantity Δ in step 22 ($P_i = P_i - \Delta$). In step 23, the index i is increased by 1. The method then returns to the test at step 21.

If the test at step 21 gives the answer "yes", that means that the sum of the programmed power increases is equal to the sum of the programmed power decreases and that the looked-for objective has been reached. It then remains to send the power increase and decreases instructions to the terminals (step 24) and end the processing concerned (end step 25). The method may be restarted at a later time at step 10.

In this implementation, the n2 terminals most favored by transmission conditions share equally a decrease in power required to compensate the increase in power that is likewise equally shared between the n1 least favored terminals. The step sizes of power increase and decrease may be variable or fixed (e.g. ±0.25 dB).

In the preferred embodiment described above, it is the terminals that are benefitting from the best signal-to-noise ratios that will be required to decrease transmission power, to the advantage of terminals having the smallest signal-to-noise ratios, or at least to the advantage of those terminals whose transmission power is to be increased.

The value of the Eb/No ratio corresponding to a particular terminal can be obtained in various different ways: for example, it is possible to insert a signal cyclically in the wanted signal and to compare it with a reference signal, or to analyze a signal that is transmitted in the pilot sequence, or indeed to compare the unspread wanted signal with the received signal prior to unspreading in order to estimate the signal-to-noise ratio. This technique is described, for example, in the article "Closed-loop power control in CDMA systems" by C. C. Lee and R. Steele, IEE Proc. Commun., Vol. 143, No. 4, August 1996. Other existing techniques can be implemented.

The invention is equally applicable to networks that provide coverage for fixed terminals or for mobile terminals. With mobile terminals, it is essentially the mobility of the terminals that makes it necessary to manage transmission powers, whereas with fixed terminals, it is the connection and disconnection of terminals to and from the network that make such management necessary.

The invention also relates to controlling terminal transmission power for a group of cells. In this case, a plurality of base stations of the kind described above transmit the data in their FIG. 2 tables to a base station controller. This controller, referenced 33 in FIG. 3, takes all of the received data into account and can then make decisions concerning terminal transmission power increases and decreases using the method of the invention, after which the base stations 30 to 32 relay instructions from the controller to the terminals.

The invention also provides a base station for a CDMA type cellular network in which terminals are to communicate. The base station includes means for allocating to terminals that are suffering from up transmission of insufficient quality shares in a total transmission power resource that are equal to the sum of the transmission power decreases requested of terminals benefiting from up transmission of better quality.

The invention also provides a controller of base stations in a CDMA type network, the controller including means for allocating to terminals that are suffering from up transmission of insufficient quality shares in a total transmission power resource that are equal to the sum of the transmission power decreases requested of terminals benefiting from up transmission of better quality.

As mentioned above, the terminals whose transmission powers are decreased are preferably those benefitting from the best up transmission conditions, however it is also possible to decrease the transmission powers of terminals that are merely benefiting from better up transmission conditions.

Transmission may be purely of the CDMA type, or else, while still retaining its spectrum spreading characteristic, it may be associated with other transmission methods, e.g. of the CDMA type.

What is claimed:

1. A method of controlling a transmission power of a plurality of terminals communicating with at least one base station in a CDMA type cellular network, the method comprising the steps of:

(a) authorizing a number n1 of said terminals to each increase the transmission power of signals transmitted from said n1 terminals to said base station, wherein a total sum of each of the increases of transmission power by said n1 terminals equals P dB; and (b) instructing a number n2 of said terminals to decrease the transmission power of signals transmitted from said n2 terminals to said base station, wherein said n2 terminals are experiencing better transmission quality than said n1 terminals for signals transmitted to said base station, and a total sum of each of the decreases in transmission power by said n2 terminals equals P dB.

2. A method according to claim 1, wherein said step (a) further comprises selecting said n1 terminals based on the transmission quality of signals transmitted from said terminals to said base stations prior to authorizing said n1 terminals to each increase the transmission power.

3. A method according to claim 2, wherein the transmission quality is a signal-to-noise ratio.

4. A method according to claim 1, wherein said terminals are mobile terminals.

5. A method according to claim 1, wherein steps (a) and (b) are applied in said base station of said CDMA type cellular network.

6. A method according to claim 1, wherein said steps (a) and (b) are applied in a controller of base stations in said CDMA type cellular network.

7. A method according to claim 1, wherein said step (a) further comprises determining a total transmission power of signals received at said base station from said terminals and authorizing said n1 terminals to increase the transmission power of signals transmitted from said n1 terminals to said base station when the total transmission power of said signals received at the base station exceeds a first threshold value.

8. A method according to claim 1, estimating a total transmission power of signals received at said base station from said terminals based on power increase or decrease instructions previously transmitted to said terminals from said base station and authorizing said n1 terminals to increase the transmission power of signals transmitted from said n1 terminals to said base station when said estimated total transmission power of said signals received at the base station exceeds a second threshold value.

9. A base station of a CDMA type cellular network in which terminals are to communicate, said base station allocating to a number n1 of said terminals suffering from insufficient transmission quality for signals transmitted from said n1 terminals to said base station shares in a total transmission power resource which are equal to a sum of power decreases requested of a number n2 of terminals benefiting from better transmission quality for signals transmitted from said n2 terminals to said base station.

10. A base station controller in a CDMA type network including a plurality of terminals communicating with a plurality of base stations, said base station controller linked to said base stations and allocating to a number n1 of said terminals suffering from insufficient transmission quality for signals transmitted from said n1 terminals to said base stations shares in a total transmission power resource which are equal to a sum of power decreases requested of a number n2 of terminals benefiting from better transmission quality for signals transmitted from said n2 terminals to said base stations.

11. A CDMA type cellular network comprising:

a plurality of terminals; and a base station communicating with said terminals, said base station allocating to a number n1 of said terminals suffering from insufficient transmission quality for signals transmitted from said n1 terminals to said base station shares in a total transmission power resource which are equal to a sum of power decreases requested of a number n2 of terminals benefiting from better transmission quality for signals transmitted from said n2 terminals to said base station.

12. A CDMA type network comprising:

a plurality of a base stations;

a plurality of terminals communicating with said base stations; and a base station controller linked to said base stations, said base station controller allocating to a number n1 of said terminals suffering from insufficient transmission quality for signals transmitted from said n1 terminals to said base stations shares in a total transmission power resource which are equal to a sum of power decreases requested of a number n2 of terminals benefiting from better transmission quality for signals transmitted from said n2 terminals to said base stations.

* * * * *